United States Patent
Crozier et al.

(10) Patent No.: US 9,747,265 B2
(45) Date of Patent: Aug. 29, 2017

(54) DYNAMICALLY GENERATING A PLURALITY OF INTERFACES USING STRUCTURED CONTROL FILES

(75) Inventors: Steven Lloyd Crozier, Toronto (CA); Antonio Giuliano, Bolton (CA); Rajiv Manucha, Toronto (CA)

(73) Assignee: MANAGEMENT SYSTEMS RESOURCES, INC., Toronto (CA)

( * ) Notice: Subject to any disclaimer, the term of this patent is extended or adjusted under 35 U.S.C. 154(b) by 0 days.

(21) Appl. No.: 13/072,413

(22) Filed: Mar. 25, 2011

(65) Prior Publication Data

US 2012/0246145 A1    Sep. 27, 2012

(51) Int. Cl.
G06F 7/00       (2006.01)
G06F 17/00      (2006.01)
G06F 17/22      (2006.01)
G06F 17/30      (2006.01)

(52) U.S. Cl.
CPC ........ *G06F 17/227* (2013.01); *G06F 17/2247* (2013.01); *G06F 17/30557* (2013.01); *G06F 17/30569* (2013.01)

(58) Field of Classification Search
None
See application file for complete search history.

(56) References Cited

U.S. PATENT DOCUMENTS

| | | | | |
|---|---|---|---|---|
| 5,701,453 A * | 12/1997 | Maloney et al. | ............. | 707/714 |
| 5,999,924 A * | 12/1999 | Bair et al. | ............. | 707/700 |
| 7,640,496 B1 * | 12/2009 | Chaulk | ............. | G06F 3/067 |
| | | | | 707/999.102 |
| 2005/0267976 A1 * | 12/2005 | Chang et al. | ............. | 709/230 |
| 2008/0028327 A1 * | 1/2008 | Hirota | ............. | G06F 8/38 |
| | | | | 715/762 |
| 2008/0270369 A1 * | 10/2008 | Myerson et al. | ............. | 707/4 |
| 2009/0083650 A1 * | 3/2009 | Kennedy et al. | ............. | 715/771 |
| 2010/0169333 A1 * | 7/2010 | Matsuka | ............. | 707/758 |
| 2010/0293523 A1 * | 11/2010 | Ahadian et al. | ............. | 717/108 |
| 2012/0216137 A1 * | 8/2012 | Aman | ............. | G06F 8/38 |
| | | | | 715/765 |

\* cited by examiner

*Primary Examiner* — Jau-Shya Meng
(74) *Attorney, Agent, or Firm* — Tysver Beck Evans, PLLC

(57) ABSTRACT

A system and method allowing customization of a user-interface into a data repository are disclosed. Customization options are provided via a hierarchy and/or compartmentalization of structured control files such as Extensible Markup Language (XML) files. The control files may be defined in a hierarchical fashion allowing a particular end-user or group of end-users to customize their interface without impacting other users of the same data and user-interface system. Compartmentalization of functions to specific files may also aid in ease of maintenance of customizations. Customization may include an ability to customize what data is shown on a screen and which capabilities are available on each screen for data interaction pertaining to a particular job responsibility. Capabilities to provide these and other customization options to an end-user are disclosed using an example of an import export trade transaction storage and retrieval system.

12 Claims, 9 Drawing Sheets

```xml
<?xml version="1.0" encoding="utf-8" ?>
<!-- everything should be in small letters -->
<!-- if keytype = foreign, mention parent table name -->
<tableScheme>

<!-- Shipment Consolidation (Information for table called Shipment Consolidation) -->

<tablestructure id="shipment_consolidation" label="Shipment consolidation" majortable="shipment_consolidation" alias="shp" hidden="yes" primarykey="scc_id">
  <field id="scc_id" friendlyname="scc_id" datatype="varchar" controltype="textbox" hidden="yes" keytype="primary" foreignkeytable="" size="10" />
  <field id="scc_mot_id" friendlyname="Mode of Trans." datatype="varchar" controltype="autocomplete" hidden="no" keytype="foriegn" foreignkeytable="Mode_of_Transportation" size="10" codefield="MOTC_CODE" descfield="MOTC_DESC" idfield="MOTC_ID" />
  <field id="scc_portentry_id" friendlyname="Port Entry" datatype="varchar" controltype="textbox" hidden="no" keytype="" foreignkeytable="" size="10" />
</tablestructure>

<!-- Shipment Header (Information for table called Shipment Header) -->

<tablestructure id="shipment_header" label="Shipment Header" majortable="shipment_header" alias="shph" primarykey="shc_id">
  <field id="shc_id" friendlyname="shc_id" datatype="varchar" controltype="textbox" hidden="yes" keytype="primary" foreignkeytable="" size="10" />
  <field id="shc_sc_id" friendlyname="shc_sc_id" datatype="varchar" controltype="textbox" hidden="yes" keytype="foriegn" foreignkeytable="shipment_consolidation" size="10" />
  <field id="shc_vendor_id" friendlyname="Vendor" datatype="varchar" controltype="autocomplete" hidden="no" keytype="foriegn" foreignkeytable="entity_link" size="10" codefield="ENTC_CODE" descfield="ENTC_DESC" idfield="ENTC_ID" />
</tablestructure>
```

```
<!-- Customs Entry (Information for table called Customs Entry)-->

<tablestructure id="customs_entry" label="Customs Entry" majortable="customs_entry"
alias="cusen" primarykey="cec_id">
  <field id="cec_id" friendlyname="cec_id" datatype="varchar" controltype="textbox"
hidden="yes" keytype="primary" foreignkeytable="" size="10" />
  <field id="cec_sh_id" friendlyname="cec_sh_id" datatype="varchar" controltype="textbox"
hidden="yes" keytype="foriegn" foreignkeytable="shipment_header" size="10" />
  <field id="ced_actrecvdate" friendlyname="Active Date" datatype="datetime"
controltype="daterange" hidden="no" keytype="" foreignkeytable="" size="" />
  <field id="ced_delivery" friendlyname="Delivery Date" datatype="datetime"
controltype="daterange" hidden="no" keytype="" foreignkeytable="" size="" />
  <field id="cec_typecode" friendlyname="Type Code" datatype="varchar" controltype="textbox"
hidden="no" keytype="" foreignkeytable="" size="10" />
</tablestructure>

</tablesScheme>
```

Fig. 4B

```xml
<?xml version="1.0" encoding="utf-8" ?>
<!-- relation between two tables like shipment_consolidation and shipment header -->
<!-- childjoin should exist if countjoin=2 -->
<!-- Join id should be foreignkey table | major table, come from main xml file when we select any field from treeview -->
<tablejoins relationid="" reportname="Transaction header Report" majortable="shipment_consolidation">
<join relationid="shipment_consolidation_header" parenttable="shipment_consolidation" childtable="shipment_header" linkfieldid="shc_sc_id" parentfieldid="scc_id" jointype="inner" filter="" visiblefield="" countjoin="1" childalias="" />
<join relationid="shipment_customs_entry" parenttable="shipment_header" childtable="customs_entry" linkfieldid="cec_sh_id" parentfieldid="shc_id" jointype="inner" filter="" visiblefield="" countjoin="1" childalias="" />
<join relationid="vendor_entity" parenttable="shipment_header" childtable="Entity_Link" linkfieldid="shc_vendor_id" parentfieldid="elc_id" jointype="left outer" filter="" visiblefield="vent.entc_desc" countjoin="2" childalias="velc" />
<join relationid="importer_entity" parenttable="shipment_header" childtable="Entity_Link" linkfieldid="shc_importer_id" parentfieldid="elc_id" jointype="left outer" filter="" visiblefield="ient.entc_desc" countjoin="2" childalias="ielc" />
<join relationid="country_table | shipment_header" parenttable="shipment_header" childtable="country_table" linkfieldid="shc_ctryorig_id" parentfieldid="ctyc_id" jointype="left outer" filter="shc_ctryOrig_id=ctyc_id" visiblefield="ctc.ctyc_desc" countjoin="1" childalias="ctc" />
<join relationid="country_table | line_item_detail" parenttable="line_item_detail" childtable="country_table" linkfieldid="detc_orgn_id" parentfieldid="ctyc_id" jointype="left outer" filter="detc_orgn_id=ctyc_id" visiblefield="ctcl.ctyc_desc" countjoin="1" childalias="ctcl" />
<join relationid="currency_table | line_item_detail" parenttable="line_item_detail" childtable="currency_table" linkfieldid="detc_curr_id" parentfieldid="curc_id" jointype="left outer" filter="detc_curr_id=curr_id" visiblefield="curc_desc" countjoin="1" childalias="curc" />
<join relationid="mode_of_transportation | shipment_consolidation" parenttable="shipment_consolidation" childtable="mode_of_transportation" linkfieldid="scc_mot_id" parentfieldid="motc_id" jointype="left outer" filter="scc_mot_id=motc_id" visiblefield="motc_desc" countjoin="1" childalias="" />
```

```
<childjoin childrelationid="entity_link_child" parentid="vendor_entity">
<join relationid="entity_link_child" parenttable="Entity_Link" childtable="entity_table" linkfieldid="entc_id"
parentfieldid="velc.elc_ent_id" jointype="left outer" filter="" visiblefield="" countjoin="1" childalias="vent" />
</childjoin>
<childjoin childrelationid="entity_link_child" parentid="importer_entity">
<join relationid="entity_link_child" parenttable="Entity_Link" childtable="entity_table" linkfieldid="entc_id"
parentfieldid="ielc.elc_ent_id" jointype="left outer" filter="" visiblefield="" countjoin="1" childalias="ient" />
</childjoin>
<join relationid="value_for_duty_code|line_item_detail" parenttable="line_item_detail"
childtable="value_for_duty_code" linkfieldid="detc_vfdcode_id" parentfieldid="vfdc_id" jointype="left outer"
filter="detc_vfdcode_id=vfdc_id" visiblefield="vfdc_desc" countjoin="1" childalias="vfd" />
<join relationid="tariff_code_rates|import_rating" parenttable="import_rating" childtable="tariff_code_rates"
linkfieldid="irc_tariff" parentfieldid="tcrc_id" jointype="left outer" filter="irc_tariff=tcrc_id"
visiblefield="tcrc_code" countjoin="1" childalias="tcr" />
<join relationid="tariff_treatment|import_rating" parenttable="import_rating" childtable="tariff_treatment"
linkfieldid="irc_ttrt" parentfieldid="ttc_id" jointype="left outer" filter="irc_ttrt=ttc_id" visiblefield="ttc_desc"
countjoin="1" childalias="tt" />
<tableleftjoins>
<join id="shc_sc_id" parenttable="shipment_consolidation" childtable="shipment_header" parentid="scc_id"
parentalias="sc" childalias="sh" jointtype="inner" />
<join id="cec_sh_id" parenttable="shipment_header" childtable="customs_entry" parentid="shc_id"
parentalias="sh1" childalias="ce" jointtype="inner" />
<join id="detc_sh_id" parenttable="shipment_header" childtable="line_item_detail" parentid="shc_id"
parentalias="sh2" childalias="ld" jointtype="inner" />
<join id="irc_det_id" parenttable="line_item_detail" childtable="import_rating" parentid="detc_id"
parentalias="lid2" childalias="im" jointtype="inner" />
</tableleftjoins>
</tablejoins>
```

Fig. 4D

```xml
<?xml version="1.0" encoding="utf-8" ?>

<reportstructure id="transaction_summary_report">

<nodesection label="Basic">
<field id="shc_importer_id" label="Importer" whereclause="Yes" />
<field id="cec_entryno" label="File No" whereclause="Yes" />
</nodesection>

<nodesection label="Transportation Related">
<field id="scc_mot_id" label="Mode of Transportation" whereclause="Yes" />
</nodesection>

<nodesection label="Customs Related">
<field id="cec_typecode" label="Type Code" whereclause="Yes" />
<field id="scc_portentry_id" label="Port Entry" whereclause="Yes" />
</nodesection>

<nodesection label="PO/Invoice Related">
<field id="shc_vendor_id" label="Vendor" whereclause="Yes" />
<field id="detc_ponum" label="PO Number" whereclause="Yes" />
<field id="detd_podate" label="PO Date" whereclause="Yes" />
</nodesection>

<nodesection label="Shipment Values">
<field id="cen_totvfd" label="VFD Amount" whereclause="Yes" />
<field id="cen_totduty" label="Duty Amount" whereclause="Yes" />
<field id="cen_totetax" label="Excise Amount" whereclause="Yes" />
<field id="cen_totsima" label="SIMA Amount" whereclause="Yes" />
<field id="cen_totftax" label="GST Amount" whereclause="Yes" />
</nodesection>

</reportstructure>
```

451 — `<?xml version="1.0" encoding="utf-8" ?>`
452 — `<reportstructure id="transaction_summary_report">`
453 — `<nodesection label="Basic">`
450

Fig. 4E

DYNAMICALLY GENERATING A PLURALITY OF INTERFACES USING STRUCTURED CONTROL FILES

FIELD OF THE DISCLOSURE

This disclosure relates generally to a system and method for providing a user-customizable interface via a hierarchy and/or compartmentalization of structured control files. More particularly, but not by way of limitation, the user interface can be customized based on user preferences relative to the data a particular type of user may wish to see at a given time on a screen or in a report (e.g., based on the business responsibility of a user). The user interface may also be customized relative to user controls made available in a screen of a Graphical User Interface (GUI). Further, the structured control files may be used to define interfaces to databases and particular tables within one or more databases.

BACKGROUND

Today's corporate computing environments maintain huge amounts of data pertaining to business information. Business information may be virtually any kind of data needed to maintain a business and to comply with regulations regarding a regulated business. In the area of import and export, large amounts of data must be maintained for long periods of time. This data must remain accessible for: compliance screening, auditing, transaction tracking, and other business reasons.

Some of the complexities associated with maintaining and using vast amounts of data stored for long periods of time include, but are not limited to, data table structures and databases changing over time, hard-coded user interface screens which are non-flexible, limited pre-defined "customization" options in a user interface, etc. User interface screens are typically designed by a software developer at a user-interface design time. User-interface design time typically occurs long before actual end-user usage. Different methods for allowing end-user customization are utilized by designers and can be intended to predict a user's future needs. However, over time, screens may become outdated and show data not of interest or may not allow required user controls over certain fields. Some possible side effects of an outdated information screen may be that the screen requires excessive panning and scrolling by an end-user or there may be limited filtering capability for data on a screen (as well as many other inconveniences).

These and other problems largely arise because a developer at design time (well ahead of actual end-user usage) is attempting to implement a "one-size fits all" capability. Also, the designer is typically forced to base designs on requirements of "typical" rather than individual users. Additionally, desires of an end-user performing a particular function may change over time as the responsibilities associated with their job change. In a corporate environment, requests to update a user interface are typically provided by an end-user filling out a change request and providing that change request to a development team. The end-user is then stuck with using the old and potentially cumbersome outdated interface while the development team prioritizes multiple change requests and produces a new version of the user-interface for a potentially large number of users.

Another example of how user interfaces to data may become obsolete can occur when the structure of the data storage changes over time. Historical data may be migrated in some form or fashion to the new structure (possibly without all fields of information) or maintained in two different data sources (e.g., old database/tables for old data and new database/tables for new data). User interfaces of the prior art may not be flexible enough to adapt to changing locations of data sources.

In summary, users accessing this vast amount of data may have different requirements and preferences as to how a user desires to interact with the data. Prior art techniques exist to provide limited end-user customization for applications and screens used to access and view data. Because of these concerns and other limitations a more general method and system for an end-user to customize how their particular interface functions may be desirable. Customization may include an ability to customize what data is shown on the screen and what capabilities are available on each screen to interact with that data. Also, a user may wish to customize what is shown to limit it to data of interest without necessarily being subjected to data fields not pertaining to a task at hand. Capabilities to provide these and other customization options to an end-user are disclosed below in a non-limiting embodiment of an import export trade transaction storage and retrieval system.

BRIEF DESCRIPTION OF THE DRAWINGS

FIGS. 4A-E illustrate one example of three (3) structured XML files and their corresponding relationship according to one disclosed embodiment.

DETAILED DESCRIPTION

Disclosed are embodiments of a Trade Transactions Storage and Retrieval System (TTSRS) implemented in a computer system configured to execute a distributed application. TTSRS requires maintenance of detailed data of all financial, import, export, and taxation related transactions for a long period of time (e.g., six to eight years) as mandated under various Federal and Provincial Regulations. As a result, businesses of all sizes must manage ever increasing amounts of data from computer databases. Employees of these businesses must maintain and document the details of any information stored in these databases that may be required for legal, audit or business reasons etc. Access to current and historical data will typically vary widely based on the roles and responsibilities of personnel employed at a business. To address these and other issues, disclosed are embodiments of utilizing structured control files (e.g., XML files) to "drive" an application interfacing with a data store.

Because of the nature of an import/export business many attributes of each import/export transaction must be maintained for a long period of time. User's interacting with the stored data will have different roles and responsibilities and the roles and responsibilities of a particular user may change over time. For example, a database may be migrated to long term storage because it contains information concerning historical transactions. During the migration database tables may be altered or combined to "simplify" historical maintenance (e.g., reduce space consumption because data is no longer "active"). However, just because the data stored in the migrated databases is historical does not mean to imply that no users still require access to portions of that data. Additionally, because the actual structure of storage could have been changed it is possible that user interface screens are not available or would have to be redesigned to properly present needed historical data to the users still requiring access to it.

Described below is an embodiment of a system and method utilizing structured XML files to address this and other problems. The embodiment below is explained relative to three (3) XML files, however, one of ordinary skill in the art, given the benefit of this disclosure, will understand that virtually any number of structured files, either XML or other formats, could be used to implement the concepts of this disclosure.

Figure 1:
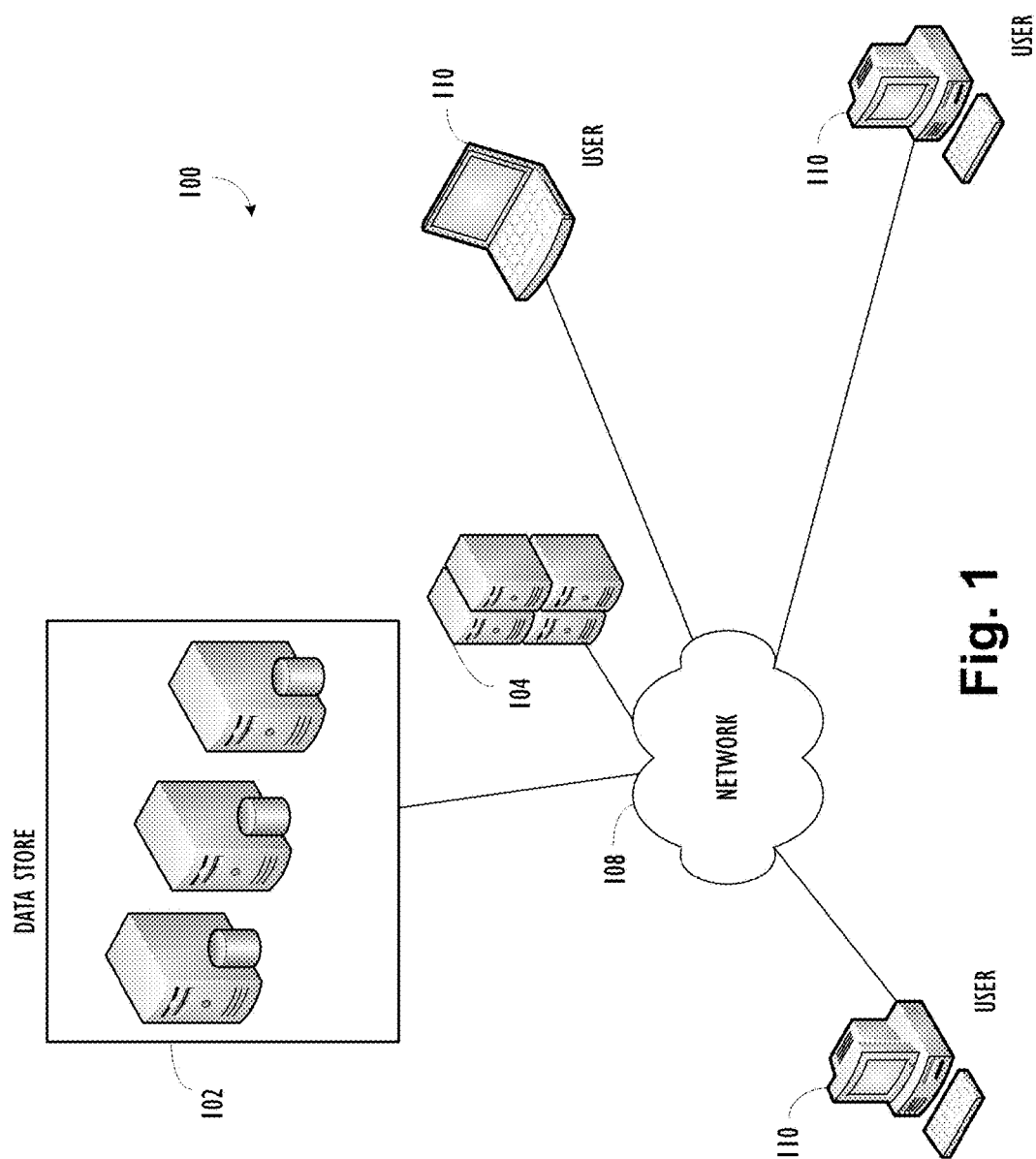
FIG. 1 illustrates a network of computer systems 100 for one possible disclosed embodiment.

Referring now to FIG. 1, network of computer systems 100 illustrates some example roles that computers and other computing devices (e.g., networks) provide to implement one embodiment of a TTSRS system. As mentioned above, a datastore 102 could consist of multiple databases and/or multiple database servers communicatively coupled to a computer network 108. Datastore 102 could contain both active and historical repositories each of which could be implemented using one or more different technologies or versions of software applications. Computer system 104 is also communicatively coupled to network 108 and may consist of one or more processors in a single or multiple computers. In this embodiment, computer system 104 provides resources for an XML engine (described further below) to facilitate generation and/or processing of a hierarchy of structured files. Also shown are end users 110 which could be either locally or remotely communicatively coupled to network 108. End users 110 will typically utilize desktop or laptop hardware (as shown) to access the resources of network computer system 100. However, it is also possible that end users 110 could have a different type of interface (e.g., mobile smart phone) that could benefit from the capabilities described in this disclosure. Also, computer network 108 can be either wired, wireless or a combination of both. Examples of computer networks include the Internet, an intranet, a local area network (LAN), a wide area network (WAN), or a combination of these and other network types.

Figure 2:
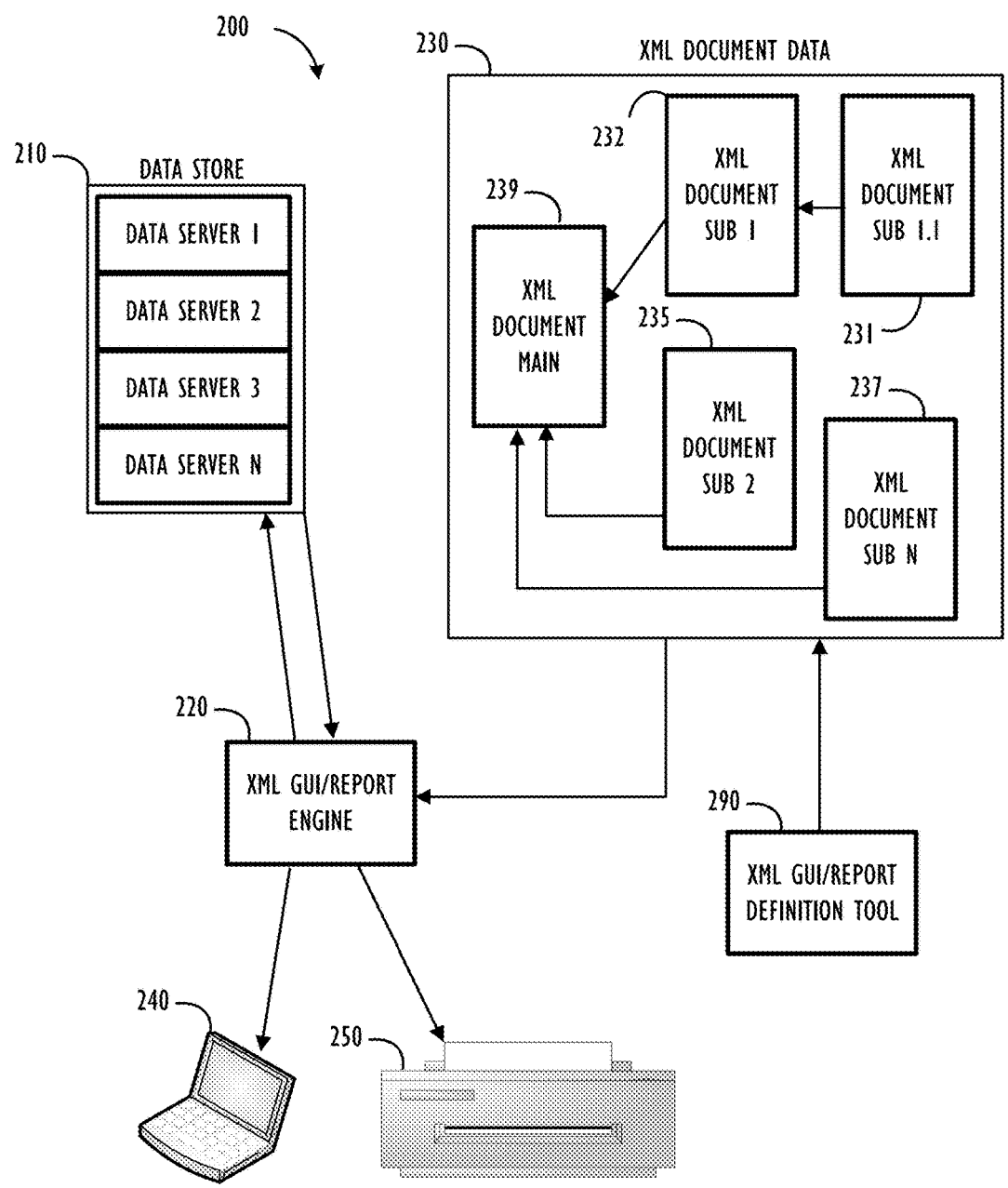
FIG. 2 illustrates a block diagram 200 of functional, logical and system components for one possible disclosed embodiment.

Referring now to FIG. 2, diagram 200 depicts different functional, logical and system components according to a disclosed embodiment. As explained above, a Data Store 210 can be implemented with any number of Data Servers (shown here as 1 through N). Each of Data Servers 1 through N may be co-located with one another or maintained at different locations. Each of the Data Servers do not necessarily need to be communicatively coupled to each other, however, it is preferred that each required data source (stored on a Data Server) is communicatively coupled to one or more computers performing the function shown here as XML GUI/Report Engine 220. As shown in diagram 200, XML GUI/Report Engine 220 obtains input from XML document data 230. XML document data 230 is shown here as a logical collection of a hierarchy of XML documents. A main XML document 239 can be thought of as a "root node" in a graph and can contain references to subordinate documents such as XML Document sub 2 (235) through XML Document sub N (237). Additionally, it is possible that an XML sub document such as XML Document sub 1 (232) could itself contain a reference to another sub document such as XML Document sub 1.1 (231). Either of these two approaches, or a combination of these two approaches, can provide that a proper hierarchy and order or precedence can be provided as depicted by logical XML document data 230. Next, system devices 240 and 250 reflect an output device (e.g., laptop or printer respectively) on which to present the results of processing (as performed by XML GUI/Report Engine 220) related to structured files (e.g., XML document data 230). Finally, XML GUI/Report Definition Tool 290 is shown here as a logical processing component used by an end user to create individual structured files for later use by XML GUI/Report Engine 220.

Figure 3A:
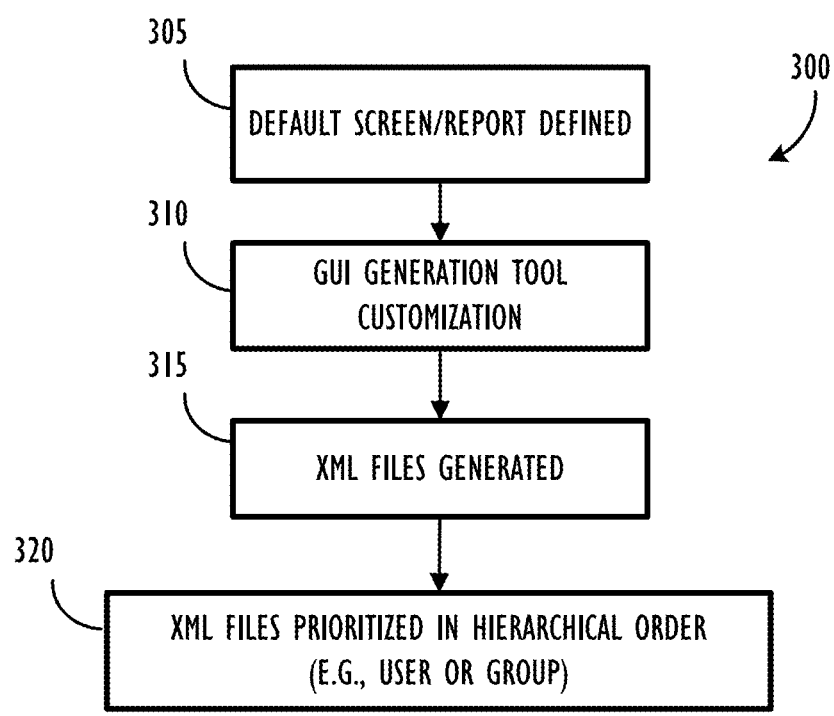
FIG. 3A illustrates a flow chart 300 outlining steps to create a hierarchy of structured files (e.g., XML files) according to one disclosed embodiment.

Referring now to FIG. 3A, process flow 300 illustrates a possible embodiment for creating a set of structured hierarchical files as might be performed by one embodiment of an XML GUI/Report Definition Tool (290 of FIG. 2). Beginning at block 305, parameters defining a default Screen or Report are obtained. These default parameters can be obtained from a default set or parameters as defined by a GUI design developer (i.e., as described above at design time) or possibly by directing a Definition Tool 290 to an already modified set of parameters in order to provide even further customization. Next, at block 310, a user can interact with the Definition Tool 290 to refine the Screen or Report to meet their individual needs at this time. As shown at block 315, at the end of the customization process, a Definition Tool 290 could output one or more structured files (in a prioritized hierarchy as shown at block 320) that can logically make up the XML Document Data (230 from FIG. 2) as described above.

Figure 3B:
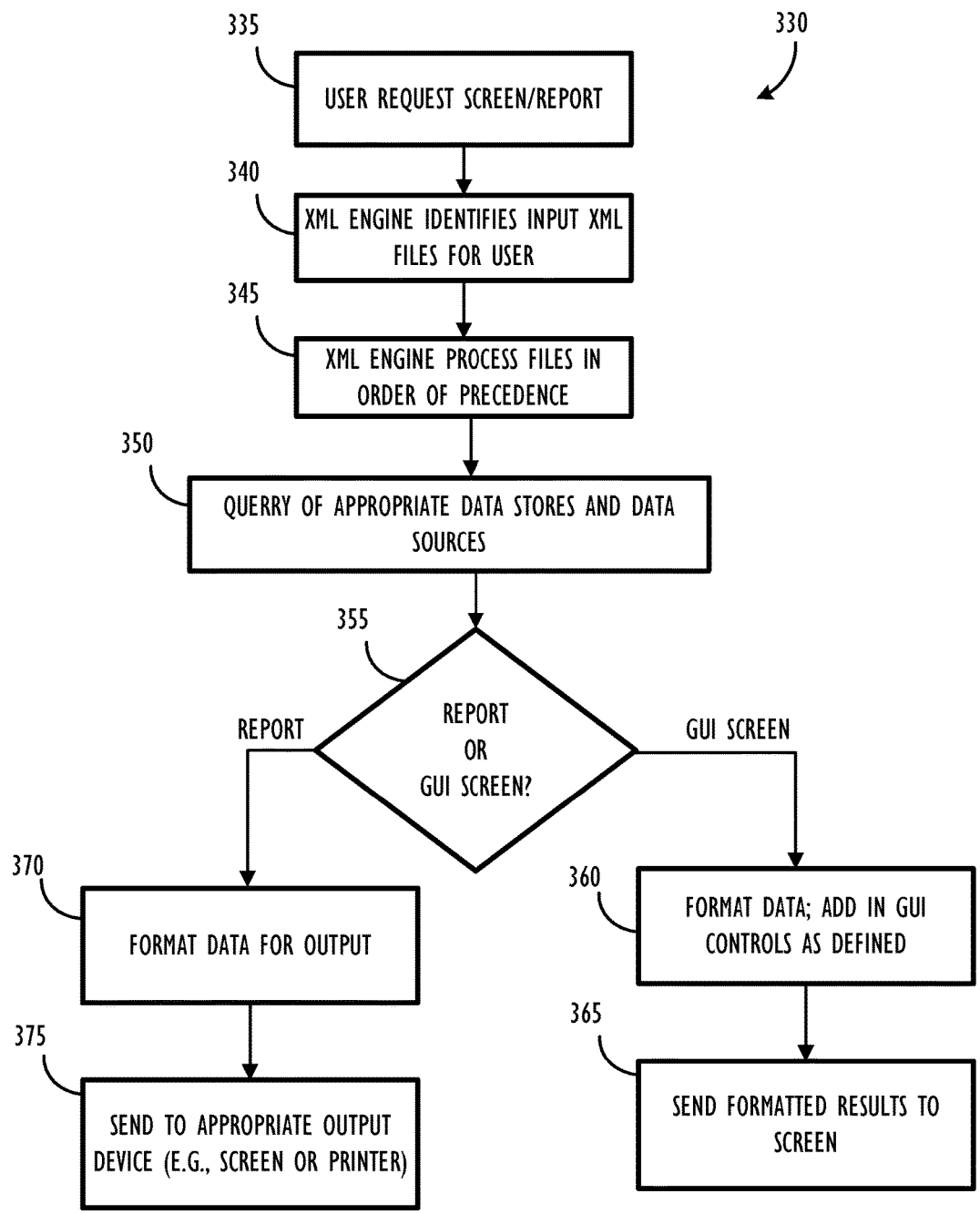
FIG. 3B illustrates a flow chart 330 outlining steps to utilize a hierarchy of structured control files (e.g., XML files) to generate a GUI or a report according to one disclosed embodiment.

Referring now to FIG. 3B, process flow 330 illustrates a possible embodiment for processing a set of structured hierarchical files as might be performed by one embodiment of an XML GUI/Report Engine (220 of FIG. 2). Beginning at block 335 a user (e.g., a user such as 110 from FIG. 1) requests a customized screen or report. Next at block 340, XML GUI/Report Engine 220 could obtain structured files in the form of logical XML Document Data 230 and process the structured files. Processing could include applying overrides as defined by the hierarchical structure and order of precedence implicit in the collection of input files (block 345). After processing to determine required data requests an XML GUI/Report Engine 220 could query appropriate data stores and data sources (block 350). Once required data has been obtained from the data sources, a check (block 355) can be performed to determine if the requested output is to be presented in the format of a static report (Report prong of block 335) or an interactive GUI screen (GUI Screen prong of block 335). If a report has been requested, flow can continue to block 370 to format the data for output. After formatting, the appropriate output can be sent to an output device, either a screen or a printer, for presentation to a user (block 375). Alternatively, if an interactive GUI screen was requested, flow can continue from block 355 to block 360 where further processing of the structured files could be applied to make certain fields adhere to interactive portions of a GUI screen such as text boxes, auto complete controls, drop down selection lists, etc. After processing of GUI fields is complete, flow can continue to block 365 where an interactive GUI screen can be presented to a user's screen.

Referring now to FIGS. 4A-E an example of three (3) structured XML files (e.g., a Main file, a Mapper file, and a Report file) are shown to illustrate an example of how these input files may be interconnected to create a logical XML Document similar to that shown in FIG. 2 element 230. For the reader's convenience only 3 files are shown, however, as mentioned above, any number of files may be processed by a computer configured to provide an XML GUI/Report Engine 220 according to the disclosed embodiments. Described in more detail in the following paragraphs, FIGS. 4A-B illustrate lines of a "Main" file defining a "tableScheme" to define basic information about database tables and to provide information to be "linked" to from subordinate structured files. FIGS. 4C-D illustrate lines of a "Mapper" file which links back to the "Main" file and defines table joins and child table joins used in constructing a query to one or more data sources. Note, a join operation is a standard database query operation known to those of skill in the art and not described in detail here. Finally, FIG. 4E illustrates lines of a "Report" file which also links back to the "Main" file and defines information useful in preparing a non-interactive GUI report.

FIG. 4A, element 400 shows the top portion of a Main file and FIG. 4B, element 410 shows the bottom portion of the Main file. This XML file is used to define an XML document delimited by the "tableScheme" tag and defines a table structure element (i.e., database table structure) and a field element (i.e., a field within a database table). In this manner, the tableScheme outlines for the XML GUI/Report Engine 220 a number of data structures (tables) and the corresponding fields of those data structures to obtain and process. Tag "tablestructure" 401 delimits an XML element which defines information related to a data structure (table) named "shipment_consolidation." As can be seen in this element the shipment_consolidation table has a primary key of "scc_id." Other attributes of this table (as stored in the database and as it is to be presented) are defined by the other XML attributes of this XML element (i.e., id, label, majortable, alias, and hidden). For clarity, the attributes of this example include:
  id=table name;
  label=friendly name to appear on GUI if not hidden;
  majortable=name of table to use for database join operations;
  alias=object name;
  hidden=display or not display attribute (i.e., yes or no);
  primarykey=primary key field of table identified in "id".

Additionally, this example Main file defines multiple "field" elements nested within the tablestructure of the shipment_consolidation table (e.g., 402 and 403). Each of the field elements define further attributes of the database table shipment_consolidation. In this example, the further attributes include:
  id=field name;
  friendlyname=Name to appear on GUI if not hidden;
  datatype=field datatype (e.g., varchar);
  controltype=type of GUI control (e.g., textbox, daterange, autocomplete, etc.);
  hidden=display or not display attribute;
  keytype=type of key field is (e.g., primary, foreign, or null (for not a key));
  foreignkeytable=name of table when keytype is foreign;
  size=size of field;
  codefield=Field name to appear on GUI if keytype is foreign;
  descfield=Desc field to appear on GUI if keytype is foreign;
  idfield=primary key if keytype is foreign;

FIG. 4C, element 420 shows the top portion of a Mapper file and FIG. 4D, element 430 shows the bottom portion of the Mapper file. This XML file is used to define an XML document delimited by the "tablejoins" tag 421 and defines a tablejoin element (i.e., database table joins for querying data from multiple tables), a join element 422 (i.e., a specific join operation), and a childjoin element 431 (i.e., a subordinate of another join operation). The Mapper file is dependent and linked to the Main file (described above) via the majortable attribute value. Note that line 421 links back to the shipment_consolidation table in the Main file at line 401.

Each tablejoins element in this example has the following attributes:
  relationid=unique key to connect to other XML files with same relationid;
  reportname=name of report defined in transaction header file;
  majortable=linkage to Main XML file.

Each tablejoins element in this example also contains multiple join elements which have the following attributes:
  relationid=unique key to connect to other XML files with same relationid;
  parenttable=parent for join operation;
  childtable=child for join operation;
  linkfieldid=linkage to other related XML files in hierarchy;
  parentfieldid=second field to use for join operation;
  jointype=type of database join operation;
  filter=for use in a select type operation;
  visiblefield=show on screen/report (y/n);
  countjoin=count of joins; and
  childalias=alias name for child table.

Additionally, there can be a childjoin element 431 defined which further defines the following attributes:
  childrelationid=relation id for child table; and
  parentid=name of parent table field.

FIG. 4E, element 450 shows the a Report file. This XML file is used to define an XML document delimited by the "reportstructure" tag 451 and defines a report. The Report file is dependent and linked to the Main file 401 and the Mapper file. The Report file further defines a nodesection element 452 and a field element 453. The nodesection element has a single attribute label which corresponds to a node name for the join operation. The field element further defines the following attributes:
  id=a key to other related XML files;
  label=a descriptive name for a field of the report; and
  whereclause=a filter operation for a select clause in a join.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

Various changes in the details of the illustrated operational methods are possible without departing from the scope of the following claims. For instance, illustrative flow chart steps or process steps of FIGS. 3A-B may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 3A-B may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, in the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method for operating a computer system to generate structured files for use in accessing data in a computerized database, wherein the structured files are used to generate a desired report, the method comprising:
   the computer system receiving user instructions identifying report data fields and join operations relating to the data in the computerized database;
   the computer system generating:
   i) a main structured file identifying schemas for a plurality of tables and data fields in the computerized database,
   ii) a mapper structured file identifying the join operations between the plurality of tables in the computerized database using fields within the tables, wherein the mapper structured file includes a plurality of tablejoin elements, wherein each tablejoin element identifies a plurality of separate join operations and each tablejoin element further identifies a report, and
   iii) a report structured file identifying the report data fields; and
   the computer system saving the generated structured files;
   the computer system receiving a request for the desired report;
   the computer system identifying the previously stored main structured file, mapper structured file, and the report structured file for the desired report;
   the computer system using the report structured file in conjunction with the mapper structured file and the main structured file to:
   i) query the data from the computerized database according to the schemas specified the main structured file and those join operations specified in a particular tablejoin element in the mapper structured file that identifies the report,
   ii) format the data, and
   iii) generate the desired report.

2. The method of claim 1, wherein the structured files comprise text based files.

3. The method of claim 2, wherein the structured files comprise extensible markup language (XML) files.

4. The method of claim 3, wherein the structured files are related by at least one uniquely identifying XML element.

5. The method of claim 1, further comprising:
   the computer system receiving user instructions identifying at least one filter to use in database operations, further wherein the filter is stored in the report structured file.

6. A method of operating a computer system to generate a selected report using data from a computerized database, the method comprising:
   the computer system receiving a request for presentation of the selected report;
   the computer system identifying and obtaining the following related structured control files for the user request:
   i) a main structured file identifying schemas for a plurality of tables in the computerized database, identifying display parameters for fields in the plurality of tables,
   ii) a mapper structured file identifying join operations between the plurality of tables in the computerized database using fields within the tables, wherein the mapper structured file includes a plurality of tablejoin elements, wherein each tablejoin element identifies a plurality of join operations and each tablejoin element is further associated with a report, wherein a selected tablejoin element is associated with the selected report, and
   iii) a report structured file for the selected report, the report structured file identifying a filter clause for at least one join operation used in the selected report;
   the computer system parsing the structured control files to identify one or more data tables in the computerized database;
   the computer system generating a database request to the computerized database, the database request comprising a request for the data from the plurality of data tables identified in the main structured file and the join operations specified in a particular tablejoin element in the mapper structured file that is associated with the report structured file as filtered by the filter clause;
   the computer system receiving a result of the database request for the data from the data tables identified in the main structured file;
   the computer system presenting the selected report.

7. The method of claim 6, wherein the computer system further initiates printing the received data.

8. The method of claim 6, wherein the structured control files comprise text based files.

9. The method of claim 8, wherein the structured control files comprise extensible markup language (XML) files.

10. The method of claim 9, wherein the structured files are related by at least one uniquely identifying XML element.

11. The method of claim 6, wherein the generated database request is directed to at least two different databases when processing a single request for presentation of the data.

12. A computer system to generate a selected report using one or more structured files, the computer system comprising:
- a network interface;
- a display device; and
- a processor communicatively coupled to the network interface and the display device;
- a machine-readable medium storing instructions, the instructions executed by the processor to:
  obtain the following related structured control files in response to receipt of a user action requesting presentation of the graphical user interface:
  i) a main structured file identifying schemas for a plurality of tables in a computerized database and identifying display parameters for fields in the plurality of tables,
  ii) a mapper structured file identifying join operations between the plurality of tables in the computerized database using fields within the tables, wherein the mapper structured file includes a plurality of tablejoin elements, wherein each tablejoin element identifies a plurality of join operations and each tablejoin element further identifies a report, wherein a selected tablejoin element identifies the selected report, and
  iii) a report structured file for the selected report, the report structured file identifying a filter clause for at least one join operation used in the selected report;
  parse the structured control files to identify one or more data tables in the computerized database;
  generate a database request to the computerized database for the desired fields, the request comprising a request for data from the data tables identified in the main structured file and at the join operations identified in a particular tablejoin element in the mapper structured file that identifies the report structured file as filtered by the filter clause;
  receive a result of the database request for the data from the data tables identified in the main structured file; and
  initiate presentation of the selected report.

* * * * *